(12) United States Patent
Wilt et al.

(10) Patent No.: US 7,600,222 B2
(45) Date of Patent: Oct. 6, 2009

(54) SYSTEMS AND METHODS FOR MANAGING DRIVERS IN A COMPUTING SYSTEM

(75) Inventors: Nicholas P. Wilt, Seattle, WA (US); James Miller, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1035 days.

(21) Appl. No.: 10/039,035

(22) Filed: Jan. 4, 2002

(65) Prior Publication Data

US 2003/0131147 A1 Jul. 10, 2003

(51) Int. Cl.
*G06F 9/45* (2006.01)
(52) U.S. Cl. .................. 717/146; 717/151; 717/159
(58) Field of Classification Search .......... 717/126, 717/137, 148; 719/321
See application file for complete search history.

(56) References Cited

U.S. PATENT DOCUMENTS

| | | | | |
|---|---|---|---|---|
| 6,148,438 | A * | 11/2000 | Schmit | 717/137 |
| 6,212,574 | B1 * | 4/2001 | O'Rourke et al. | 719/321 |
| 6,594,761 | B1 * | 7/2003 | Chow et al. | 713/190 |
| 6,615,167 | B1 * | 9/2003 | Devins et al. | 703/28 |
| 6,769,115 | B1 * | 7/2004 | Oldman | 717/126 |
| 6,871,350 | B2 * | 3/2005 | Wong et al. | 719/323 |
| 7,150,011 | B2 * | 12/2006 | Ha et al. | 717/148 |

FOREIGN PATENT DOCUMENTS

EP    1 004 962 A2    5/2000

OTHER PUBLICATIONS

"JavaOS for Businesss Version 2.0", Reference Manual, Jun. 1998. Online retrieved at <java.sun.com/developer/products/JavaOS/>.*
"Typing a multi-language intermediate code", Gordon et al., Jan. 2001, pp. 248-260. Online retrieved at <http://delivery.acm.org/10.1145/370000/360228/p248-gordon.pdf>.*
"A single intermediate language that supports multiple implementations of exceptions", Ramsey et al., Aug. 2000, pp. 285-298. Online retrieved at <http://delivery.acm.org/10.1145/350000/349337/p285-ramsey.pdf>.*
"An intermediate language for system engineering", B. Purves, Mar. 1997, pp. 157-160. Online retrieved at <http://ieeexplore.ieee.org/stamp.jsp?tp=&arnumber=581846&isnumber=12639>.*
Back, G. et al., "Techniques for the Designl of Java Operating Systems", *USENIX Annual Technical Conference*, Jun. 2000, XP-002251714, 1-14.
Hunt, G. et al., "Creating User-Mode Device Drivers with a Proxy", *Proceedings of the 1st USENIX Windows NT Workshop*, Aug. 1999, XP-002251713, 1-6.

(Continued)

*Primary Examiner*—Tuan Q Dam
*Assistant Examiner*—Thuy Dao
(74) *Attorney, Agent, or Firm*—Woodcock Washburn LLP

(57) ABSTRACT

Managed code, including applications, runtime, and driver, have a priori knowledge of the client's exact hardware configuration, just as the JIT compiler has a priori knowledge of the microprocessor type on the target computer system. At compile time, the compiler knows the effective version various system drivers, so that the compiler can emit an executable tuned for a particular driver version and target system.

22 Claims, 7 Drawing Sheets

OTHER PUBLICATIONS

Madany, P.W., "JavaOS™: A Standalone Java™ Environment-A White Paper", *JavaSoft*, May 1996, 3-16.

Ritchie, S., "Systems Programming in Java", *IEEE Micro*, May 1997, XP-000783990, 30-35.

Antoniu, G. et al., "The Hyperion system: Compiling multithreaded Java bytecode for distributed execution," *Parallel Computing*, 2001, 27(10), 1279-1297.

Radhakrishnan, R. et al., "Java Runtime Systems: Characterization and Architectural Implications," *IEEE Trans. on Computers*, 2001, 50(2), 131-146.

Sato, N., "Fast Compiler Re-Targeting to Different Platforms by Translating at Intermediate Code Level," *IEICE Trans. on Communications*, 1999, E82-B(6), 923-935.

Stoyen, A.D. et al., "Towards a Mobile Code Management Environment for Complex, Real-Time, Distributed Systems," *Real-Time Systems*, 2001, 21(1-2), 165-189.

Wall, D.W., "Experience with a Software-Defined Machine Architecture," *ACM Trans. on Programming Languages and Systems*, 1992, 14(3), 299-338.

\* cited by examiner

SYSTEMS AND METHODS FOR MANAGING DRIVERS IN A COMPUTING SYSTEM

FIELD OF THE INVENTION

The present invention relates to systems and methods for managing drivers in a computing system.

BACKGROUND OF THE INVENTION

In the context of computer system design, drivers are software components that expose hardware capabilities to the operating system, so that the operating system may in turn expose those capabilities to applications. Typically the operating system interacts with a driver through a Device Driver Interface ("DDI"), a carefully defined protocol that enables the operating system to load the driver, inquire about the capabilities provided by the hardware, and make those capabilities available to applications.

The software interfaces provided to applications by the operating system are known as Application Programming Interfaces ("APIs"). The APIs provided by the operating system provide applications with software abstractions that may or may not closely resemble the characteristics of the underlying hardware. An example of a dramatic departure from the underlying hardware is the directory/file software abstraction provided for mass storage. Another software abstraction that does not resemble the underlying hardware is virtual memory, which enables applications to transparently use local hard disk storage as though it were random access memory.

When APIs cause hardware resources to be utilized, the operating system calls the driver through the DDI to make use of those resources. Due to the differences between the software abstractions provided by APIs and the underlying hardware, this translation from API calls to DDI calls can entail significant amounts of logic and code. In the context of this specification, the software between the application-level API and the driver-level DDI is known collectively as the "runtime."

Application, drivers, etc. are generally written in a high-level language such as C. Such languages have typically been implemented primarily by compilation to native code. In such cases, drivers are written separately from the application and other programs that operate on a system. The application and drivers are then typically linked together either during an installation process or Dynamic Link Library (DLL) when the application is executed. The advantage of such a system is that the compiler can be designed to optimize the code for a particular class of processor (e.g X86). However, the compiler may not optimize the code for a particular microprocessor, e.g., PENTIUM IV versus PENTIUM III. Moreover the compiler does not optimize the code for other system parameters including driver versions and other hardware components or take into account the particular system constraints of the target system. Instead, the application or runtime level system must employ computationally expensive logic to determine such parameters and processor constraints so that the program can be compiled to execute on an entire class of computer systems.

Another common programming paradigm is to compile code at runtime. A Just-In-Time (JIT) compiler is an example of such as system. Other systems that compile at runtime include continuous compilation systems that immediately begin execution in an interpretive state but compile the code over time and continuously optimize the compilation. With just-in-time compilers, as classes are loaded into the virtual machine, the method pointers in the virtual method table are replaced with pointers to the JIT compiler. Then, the first time each method is called, the JIT compiler is invoked to compile the method. The pointer in the virtual method table is then patched to point to the native-code version of the method so that future calls to the method will jump to the native-code. These JIT compiler systems have the advantage of transmitting code to a target machine in an intermediate language (IL) such as JAVA bytecodes, Common Language Runtime (CLR) instructions, and so on. The compiler is designed to convert the IL into instructions executable by the native processor. As a result, the same IL instructions can be sent to computers having different native processors and execute nonetheless on the target processor.

Although such intermediate language compilers compile the intermediate language instructions on the target computer system, they also do not optimize the code for a particular target computer system, including accounting for driver versions and other hardware components

SUMMARY OF THE INVENTION

In view of the foregoing, the present invention provides managed code comprising applications and runtime, and/or driver. The managed code is compiled by a compiler that has a priori knowledge of the target computer system's exact hardware configuration, just as the JIT compiler has a priori knowledge of the microprocessor type on the client. At compile time, the system's effective version of various hardware drivers are known, so if an application and driver are managed, the compiler can emit an executable tuned for a particular driver version.

Accordingly, the invention comprises system and method that manage code to compile code configured for an operating system having a selected processor and a driver that interacts with a computing component. The system comprises a plurality of application instructions that are received in an intermediate language readable by an intermediate language compiler and a plurality of runtime instructions that are also received in an intermediate language readable by an intermediate language compiler. An intermediate language compiler compiles the application instructions and the runtime instructions into a set of managed code instructions executable by the processor for interacting with the selected driver. The driver (or a portion of the driver) may also be provided in the intermediate language and compiled along with the application instructions and the runtime instructions into a set of managed code instructions.

BRIEF DESCRIPTION OF THE DRAWINGS

The system and methods for managing code are further described with reference to the accompanying drawings in which.

DETAILED DESCRIPTION OF THE INVENTION

Overview

Proponents of online driver models cite performance advantages as the principal motivation for merging the API implementation into the driver. This merge has many undesirable side effects, mainly due to the inability of subsequent releases of the Runtime to add features, performance improvements, or changes of API policy on top of drivers that predated the release of the Runtime. The invention described herein recognizes that managed code, including applications, runtime, and driver, should have a priori knowledge of the client's exact hardware configuration, just as the JIT compiler has a priori knowledge of the microprocessor type on the client. For example, at JIT time, the system knows the effective version of the graphics driver (DIRECTX 6.0, DIRECTX 7.0, and so on), so if the application and driver are managed, the JIT compiler can emit an executable tuned for a particular driver version.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have data sets for which it would be desirable to perform the image boundary definition techniques of the present invention.

Figure 1:
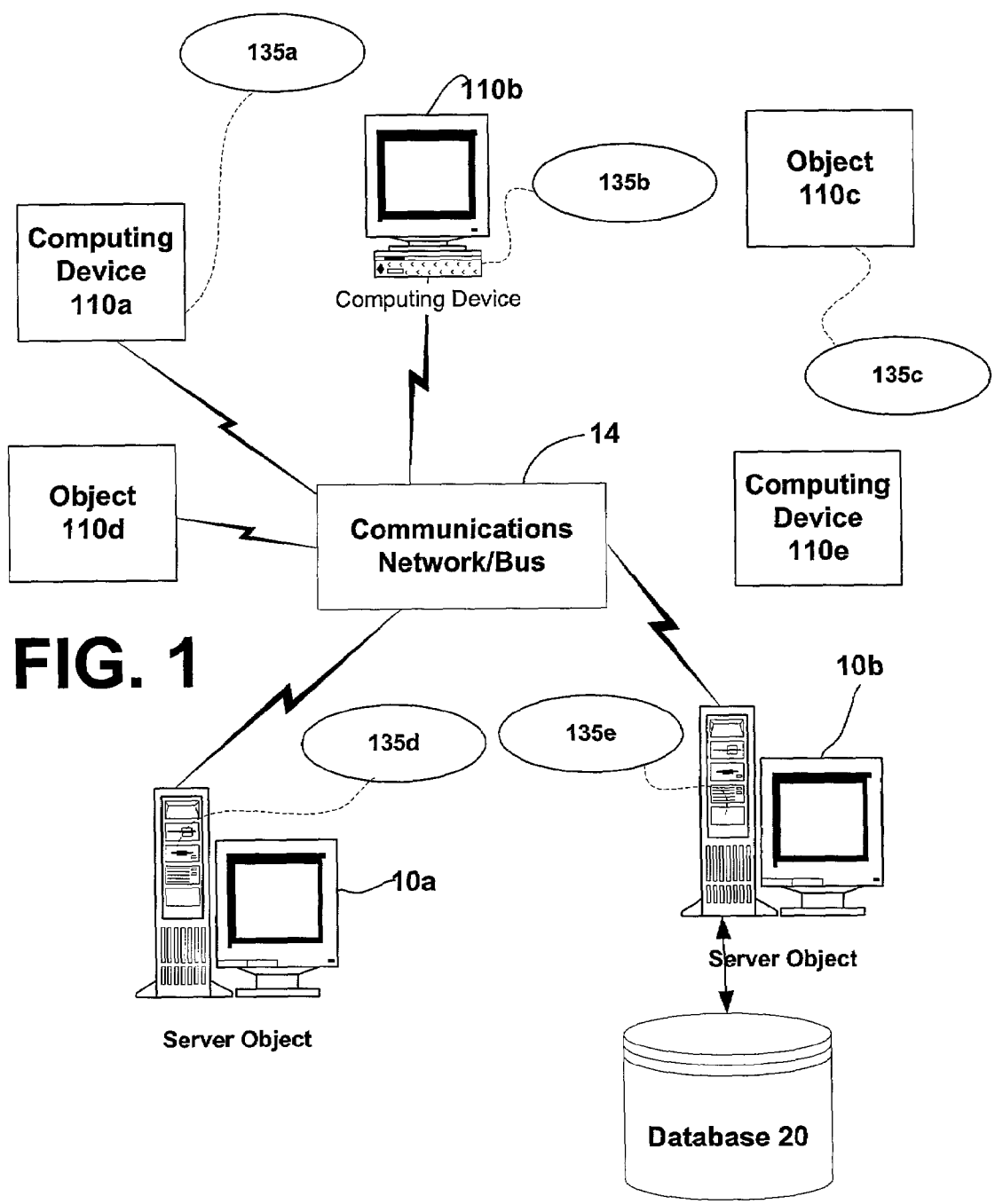
FIG. 1 is a block diagram representing an exemplary network environment having a variety of computing devices in which the present invention may be implemented.

FIG. 1 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as Personal Digital Assistant (PDA) PDAs, televisions, Motion Pictures Experts Group (MPEG) MPEG Audio Layer 3 (MP3) players, televisions, personal computers, etc. Each object can communicate with another object by way of the communications network 14. This network may itself comprise other computing objects and computing devices that provide services to the system of FIG. 1. In accordance with an aspect of the invention, each object 10 or 110 may contain data for which it would be desirable to perform image cut-out or boundary definition. It may also be desirable to compare an image cut-out from one object 10 or 110 with an image cut-out of another object 10 or 110.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. The image cut-out algorithm(s) of the present invention may be implemented in such an environment.

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, Component Object Model (COM) objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 1, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 1 illustrates an exemplary networked or distributed environment, with a server in communication with client computers via a network/bus, in which the present invention may be employed. In more detail, a number of servers 10a, 10b, etc., are interconnected via a communications network/bus 14, which may be a Local Area Network (LAN), Wide Area Network (WAN), intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to communicate to another computing device with respect to image cut-out or boundary definition services.

In a network environment in which the communications network/bus 14 is the Internet, for example, the servers 10 can be Web servers with which the clients 110a, 110b, 110c, 110d, 110e, etc. communicate via any of a number of known protocols such as hypertext transfer protocol (HTTP). Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database 20 for storing image processing software for processing images in accordance with the present invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Exemplary Computing Device

Figure 2:
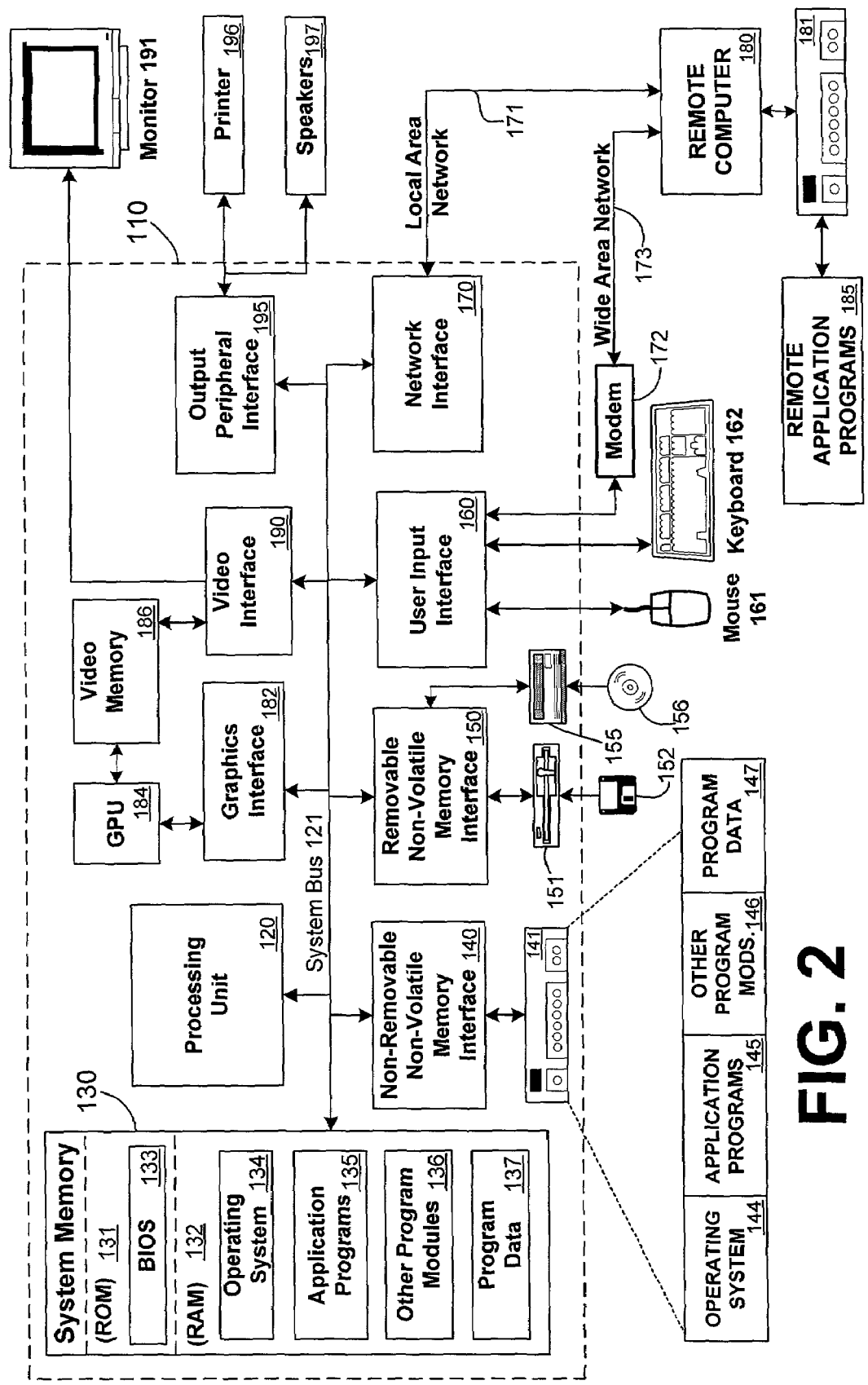
FIG. 2 is a block diagram representing an exemplary non-limiting computing device in which the present invention may be implemented.

FIG. 2 and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the image cut-out algorithm(s) of the invention.

Although not required, the invention can be implemented via an operating system, for use by a developer of services for a device or object, and/or included within application software that aids in processing image data. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for AGP communications. One or more graphics processing units (GPUs) 184 may communicate with graphics interface 182. In this regard, GPUs 184 generally include on-chip memory storage, such as register storage and GPUs 184 communicate with a video memory 186. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .Net platform includes servers, building-block services, such as Web-based data storage and downloadable device software. Generally speaking, the .Net platform provides (1) the ability to make the entire range of computing devices work together and to have user information automatically updated and synchronized on all of them, (2) increased interactive capability for Web sites, enabled by greater use of Extensive Markup Language (XML) rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

Management of Drivers in a Computing System

Figure 3A:
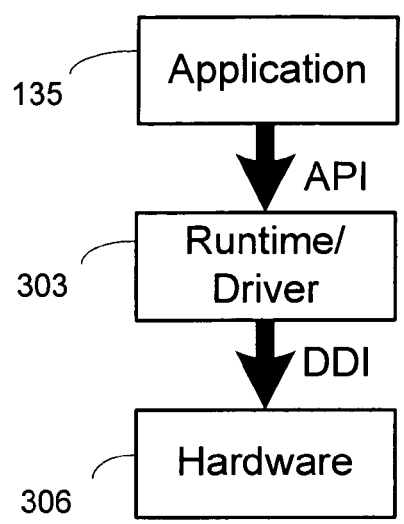
FIGS. 3A and 3B illustrate different driver models for various computing systems.
Figure 3B:
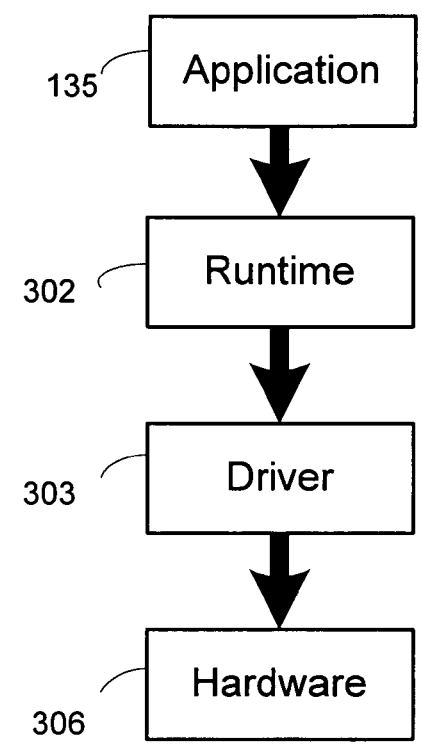

FIGS. 3A and 3B is a simple depiction of how an application program 135, runtime 302, and driver 303 interact through an API and DDI.

In the context of graphics API/DDI deployment, currently there are two prevalent driver models: an online driver model and a layered driver model. FIG. 3A depicts an online driver, essentially a full API implementation that has been instrumented to run on a particular piece of hardware e.g., video interface 190 (FIG. 2). Examples of APIs that utilize online driver models include proprietary graphics APIs such as 3Dfx Glide and ATI CIF, as well as OpenGL.

Layered drivers, as depicted in FIG. 3B, introduce an additional level of indirection in which the API implementation implements some logic (such as parameter validation) and code (such as the geometry pipeline) before calling driver 303 through the DDI. The term 'layered driver' refers not only to the idea that the API calls the DDI after doing work, but also to the idea that driver 303 can implement different 'layers' depending on how much functionality is implemented by hardware 306. For example, the DDI for a graphics hardware product that implemented rasterization only would be lower-level than for a product that implemented transform and lighting as well as rasterization.

Supporting a variety of layered drivers increases the complexity of a runtime's 302 implementation. For example, DIRECTX 7.0 from MICROSOFT, which has support for hardware-accelerated transform and lighting, must check whether the underlying driver 303 implements that feature. If so, applications 135 can create and use devices with the feature; otherwise, the feature must be emulated by runtime 302 in software. As a result, the code paths executed by DIRECTX 7.0 are significantly different depending on whether it is running on a DIRECTX 7.0-style driver or a pre-DIRECTX 7.0 driver.

Figure 4:
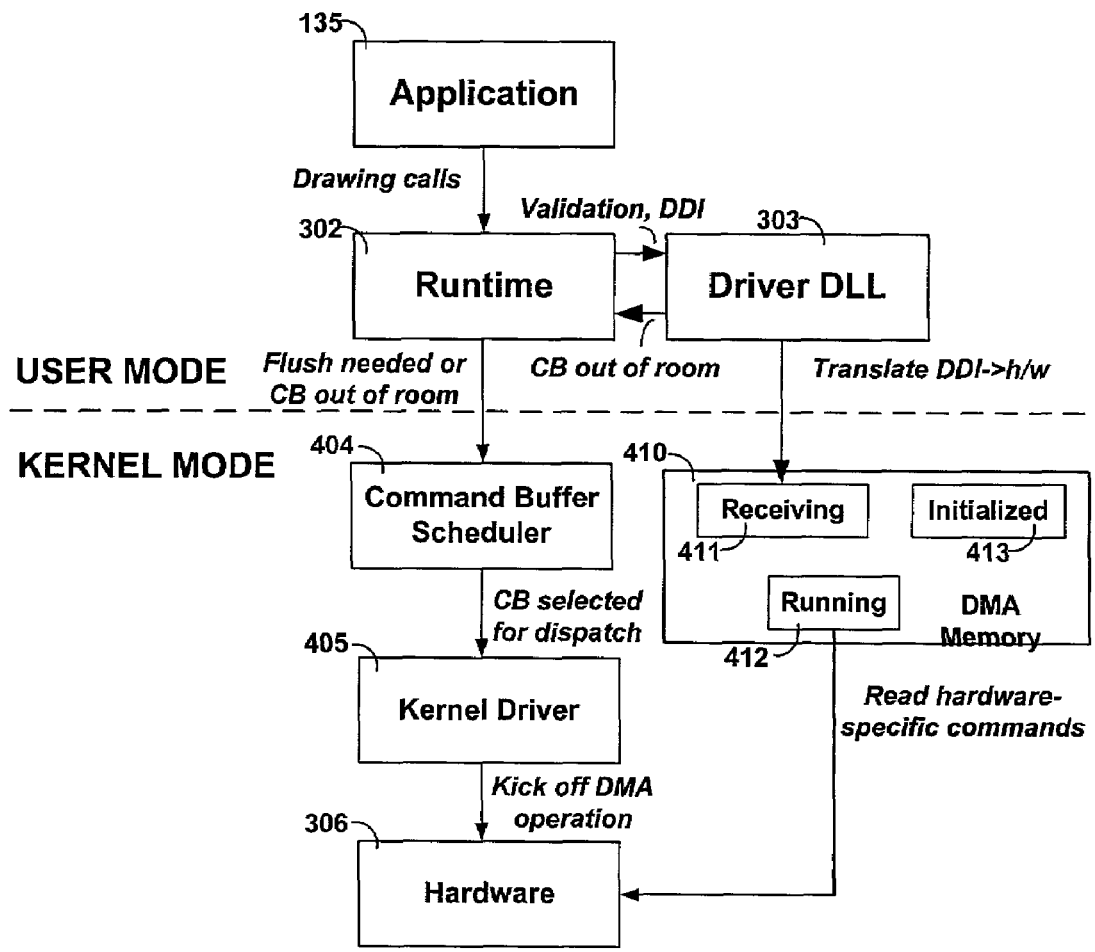
FIG. 4 is a block diagram of a computer system having a user-mode driver DLL architecture in accordance with an aspect of the invention.

FIG. 4 further illustrates the layers of an example application, runtime, and driver in a system. The Application 135, Runtime 302, and part of the Driver 303 operate in user mode to write drawing commands into hardware-specific command buffers in Direct Memory Access (DMA) memory. In a contemporary PC system, these writes would typically be non-temporal writes into AGP memory; and as depicted in this implementation example, Application 135 resides in an EXE and Runtime 302 and User Mode Driver 303 reside in DLLs that are dynamically linked into Application 135. These details of the user mode portion of the system can vary; specifically, the Application 135, Application 135 and Runtime 302, or Application 301, Runtime 302 and User Mode Driver 303 could potentially be managed code.

To defend against unauthorized replacement of a User Mode Driver (e.g., 303), a system typically queries the Kernel Driver 405 (since kernel code is trusted from a security standpoint) for User Mode Driver 303 DLL to load.

Command Buffer Scheduler 404 ("Scheduler") and Kernel Driver 405 work together in kernel mode to dispatch command buffers to Hardware 406 (Scheduler 404 decides which command buffer should be dispatched, while Kernel Driver 405 instructs Hardware 406 to dispatch a command buffer at the request of Scheduler 404). This system contemplates that the bulk of the driver logic would reside in User Mode Driver 403 DLL, not Kernel Driver 405. While User Mode Driver 403 can contain large amounts of code that maps DDI-level calls into hardware-specific commands (which operation can be complicated and error-prone, especially when compiling a vertex and/or shader program), Kernel Driver 405 is comparatively small and simple, maximizing system robustness.

Figure 5:
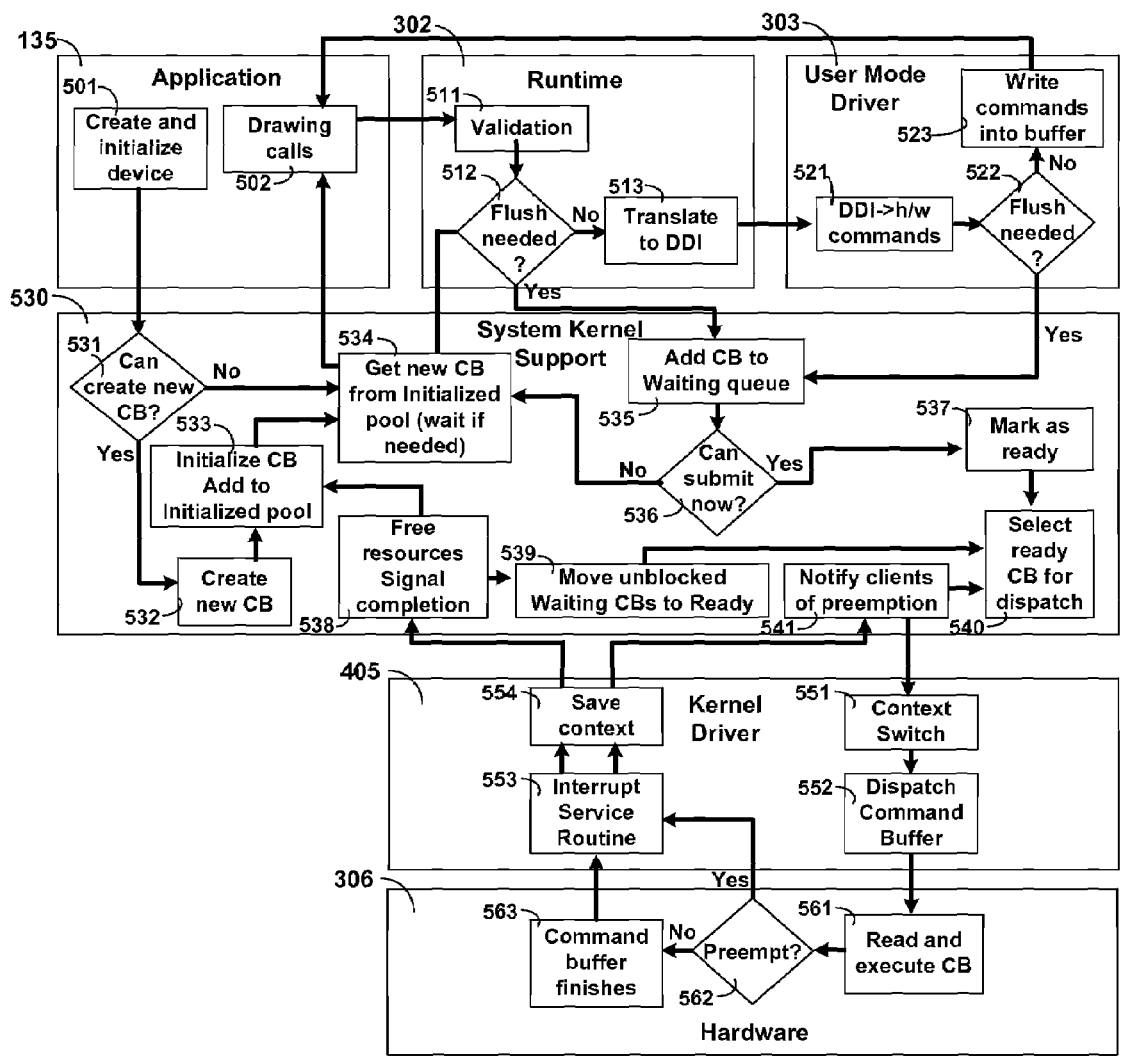
FIG. 5 illustrates the sequence of events that occur when an application making API calls in an example graphics application.

FIG. 5 clarifies the sequence of events that occur when an Application 135 is making API calls in an example of graphics operations. The command buffers are not specifically depicted in FIG. 5 as a hardware component; per FIG. 4, the User Mode Driver 303 writes hardware-specific commands into the device's current command buffer, the Command Buffer Scheduler (part of the System Kernel Support 530) dispatches the command buffer to the hardware 306 via the Kernel Mode Driver 405, and finished command buffers are recycled for use by an Application 135 in the system. Note that multiple Applications 135 can potentially share the pool of available command buffers, with the System Kernel Support 530 arbitrating sharing of that resource.

When Application 135 initially creates a drawing context 501, the System Kernel Support 530 checks to see whether a new command buffer can be created 531. If so, the new command buffer is created 532 and initialized 533, and the thread obtains an initialized command buffer 534 before the Application 135 can perform drawing calls 502. If a command buffer could not be created in step 531, Application 135 must wait until an Initialized command buffer becomes available 534. Once Application 135 has obtained a command buffer, Application 135, Runtime 302 and User Mode Driver 303 enter the typical interaction between the three components that cause hardware-specific commands to be written into the command buffer. The Drawing calls 502 from Application 135 are validated 511 by Runtime 302; a check 512 then determines whether a flush of the current command buffer is needed. If not, the drawing command is translated to a simpler, canonical DDI call 513 and passed to User Mode Driver 520. The driver translates the DDI call into hardware specific commands and attempts to write them into the command buffer. If the check 522 for flush determines that there is no room in the command buffer, the command buffer must be submitted to System Kernel Support 530 and a new command buffer obtained from same before command can be written and execution can continue. If either Runtime 302 or User Mode Driver 303 determines that a flush is needed, per step 535 the command buffer is added to the Waiting queue. At that time, the System Kernel can check 536 whether the command buffer can be submitted forthwith (typically because no command buffer is Running). If not, the command buffer is left in the Waiting queue and a new command buffer must be obtained 534. Note that this functional block, which waits until a suitable Initialized command buffer is available and then allocates it to the device, is identical to the operation needed by Application 135 before it can begin drawing.

When a Ready command buffer is selected for dispatch 540, System Kernel Support 530 has the Kernel Driver 405 context switch the hardware to the appropriate context 551 and dispatch the command buffer to the hardware 552. Hardware 306 then reads and executes the command buffer 561, until it is preempted or the command buffer finishes. If the command buffer completes normally 563, the hardware signals an interrupt and the interrupt service routine 553 executes. The ISR may wish to save the hardware context 554 at this time, although the driver may wish to defer this operation to the context switch 551, in case the hardware should be asked to execute two command buffers in a row that operate on the same context. After this step 554, the Kernel System Support 530 can free the resources needed by that command buffer 538, as well as signal any notification mechanisms such as events to let interested clients know that the command buffer is completed. After step 538, the Kernel System Support has two distinct tasks: it must reinitialize the newly available command buffer and add it to the initialized pool 533, and it must unblock any Waiting command buffers and move them into the Ready queue 539. After step 539, another command buffer can be selected for dispatch 540.

The complexity of the inter-process communications described with respect to FIGS. 4 and 5 illustrate the need for managed code in accordance with an aspect of the invention. In particular, the system described with respect to FIG. 5 could leverage managed code, in which portions of the Application 135, Runtime 302, and/or User Mode Driver 303 are delivered in intermediate language form and JIT-compiled on the client. The three components would be delivered separately to the client in intermediate language form. The JIT compiler would then synthesize them into a unified piece of object code that included portions of all three components. Such an architecture should enable a system wherein more optimal object code would be executed. In addition, constants in the Application 135's call to an entry point could be propagated into the Runtime 302 and User Mode Driver 303, potentially resulting in object code that wrote a few constant words into the command buffer instead of crossing several function call boundaries in order to achieve the same result. The intermediate language form of the Application 135 would still be hardware-independent, since the User Mode Driver 303 would be specific to the graphics hardware on the client. Moreover, all of the managed code could be delivered to the system over a network as described in FIG. 1 above.

While the best potential performance improvements should be achieved by generating managed code for all three components (i.e. Application 135, Runtime 302, and User Mode Driver 303), a system could have the Application 135 and Runtime 302 be managed and interact with a separate User Mode Driver 303, or even just Application 135 be managed and interact with separate Runtime 302 and User Mode Driver 303. In fact, such subsystems could be made to coexist peacefully, provided the intermediate language and user mode DLL forms of the Runtime 302 and/or User Mode Driver 303 were both available.

The systems could also benefit from late-bound managed code, much as has already been described. If the Runtime 302 was managed, a JIT could perform optimizations such as parameter validation checks at runtime. In the system of FIG. 4, a unified piece of object code generated by the JIT would write canonical command buffer data into DMA-able memory for eventual submission to the hardware. In the system of FIG. 5, the object code generated by the JIT would emit data into an intermediate buffer for parsing and translation by kernel mode driver 405. The section below describes the system and advantages of the managed code aspects of the invention in further detail.

Managed Code

The traditional mechanism for deployment of software has entailed writing source code, compiling the source code into executable form for a specific type of computer, and installing the executable code on the client computer so it can be run. Another methodology, enabled in the .NET infrastructure, adds an extra step to this process. The source code is translated into a readily compilable, intermediate form that is installed on the client computer. The client computer then uses a JIT ("just in time") compiler to translate intermediate code into native executable "managed" code so it can be run. There are several advantages to this approach. One advantage is that the intermediate code is platform-independent; since the translation to executable code occurs on the client, any client that knows how to compile the intermediate code can execute the application. A related advantage is that the platform-independent intermediate code can be transmitted to and run on a platform that did not exist when the code was written.

In the context of the invention, however, the most important advantage of JIT compilation is that while the managed code is being generated, the JIT compiler has a priori knowledge of the exact nature of the target computer (i.e., the client the JIT compiler is running on). If the client computer has a particular type of microprocessor, the JIT compiler can emit code that is native to that specific microprocessor. For example, the PENTIUM Pro microprocessor added conditional move instructions to the x86 instruction set, and the PENTIUM 3 microprocessor added pre-fetch and other cache management instructions that were not available on its predecessors. Supporting these microprocessor-specific instructions in traditionally-deployed software requires the developer to write source code that uses all the various features, then write detection software to figure out which code path to execute on the client that the code happens to be running on. The JIT step frees the developer from this task and even proffers the developer protection against future innovations. In other words, a computer that included a new instruction that would benefit the developer's application could include a JIT compiler that knew how to emit that instruction; the application would benefit from the new instruction even if it did not exist when the application was developed. Proponents of online driver models cite performance advantages as the principal motivation for merging the API implementation into the driver. This merge has many undesirable side effects, mainly due to the inability of subsequent releases of the Runtime to add features, performance improvements, or changes of API policy on top of drivers that predated the release of the Runtime. There is ample precedent in the history of DIRECTX that highlight the utility of API improvements that work on an installed base of drivers. These API improvements can range from easier-to-use drawing methods, such as the DIRECTX 5.0 DrawPrimitive API that worked on pre-DIRECTX 5.0 drivers; performance improvements, such as the DIRECTX 6.0 geometry pipeline that worked on pre-DIRECTX 6.0 drivers; and API-level policy changes, such as the DIRECTX 6.0 texture manager that worked on pre-DIRECTX 6.0 drivers. These types of improvements are difficult or impossible to deliver if the drivers in question are online drivers.

Figure 6:
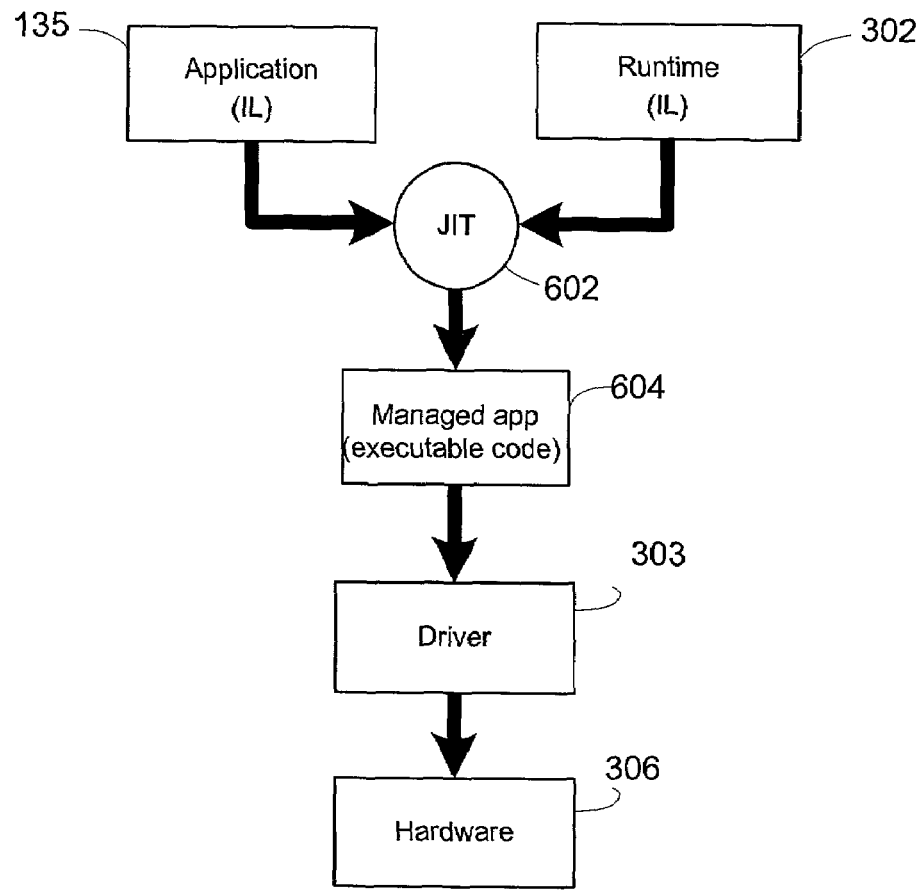
FIG. 6 illustrates the application of JIT compilation to application and runtime in accordance with an aspect of the invention.

Just as the JIT compiler has a priori knowledge of the microprocessor type on the client, it also has a priori knowledge of the client's exact hardware configuration. In particular, it has knowledge of the type of graphics processor and the associated driver in the client. For example, at JIT time, the system knows the effective version of the graphics driver (DIRECTX 6.0, DIRECTX 7.0, and so on), so if the application and driver are managed, the JIT compiler can emit an executable tuned for that driver version. FIG. 6 depicts such a system.

Application 135 and Runtime 302 are both received in an intermediate language form (IL) such as MICROSOFT's CLRT. JIT compiler 602 takes Application IL 135 and Runtime IL 302 and merges them into a single compiled Managed Application 604. That application would communicate with Drive 303 and Hardware 306 as described above.

The JIT-based approach depicted in FIG. 6 enables many optimizations, including:

- Support for different DDIs would be more efficient, since the DDI type is known at compile time. This eliminates large amounts of conditional code.
- Conditional code can be eliminated if the condition is known at JIT time—e.g. parameter validation can be eliminated for guaranteed-valid parameters.
- Trivial runtime functions can be inlined, enabling instruction scheduling around function calls.
- The executable code (both inline and in the runtime implementation) could be targeted at the specific host processor type. The importance of processor-specific optimizations is increasing as microprocessor vendors increase the rate at which they modify instruction sets.

The performance of this architecture can be improved further by leveraging an intermediate language (IL)-based driver.

Figure 7:
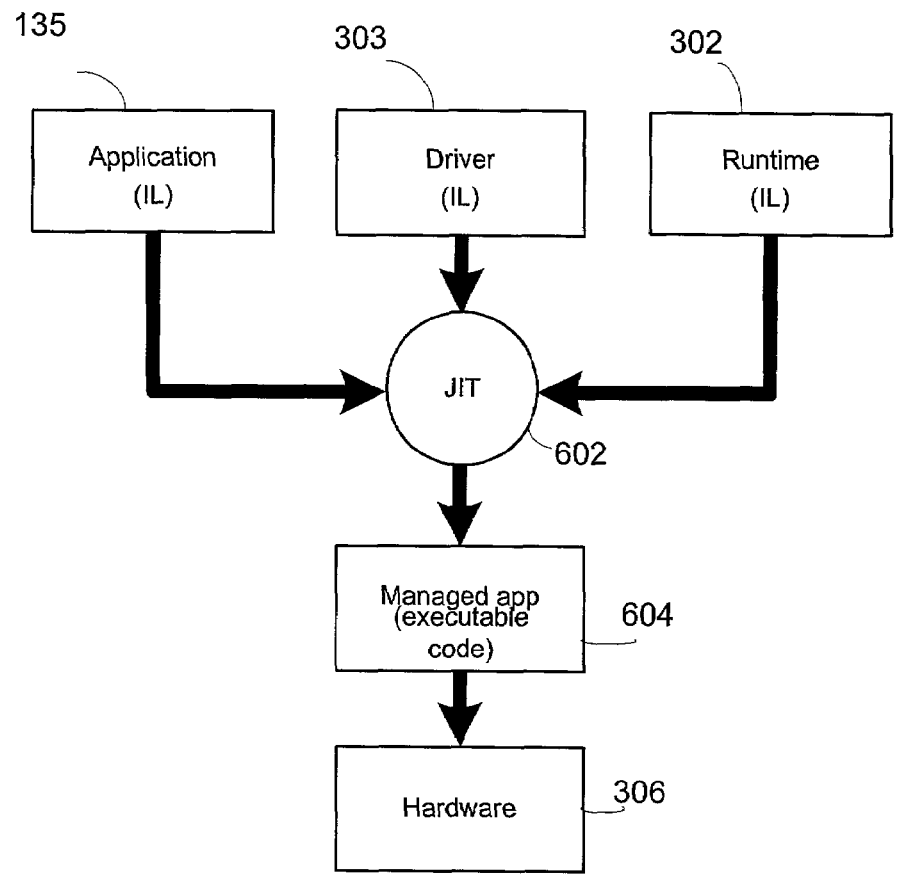
FIG. 7 illustrates the application of JIT compilation to application, driver and runtime in accordance with an aspect of the invention.

FIG. 7 provides an alternate embodiment of the managed code system. Here, the architecture would enable the compiled Application 135 to write hardware-specific commands directly into command buffers or First-in first-outs (FIFOs). Besides the performance implications, other potential benefits include reducing the engineering effort required for IHVs to deliver cross-platform drivers and better enabling validation tools to ensure the drivers' correctness. The Application 135, Runtime 302, and Driver 303 are all delivered to JIT 602 in IL form. JIT 602 converts them into a Managed Application 604.

Historically, DIRECTX has implemented a layered driver model in which the runtime translated graphics and drawing commands into a simplified, hardware-independent token stream. When the DIRECTX runtime determines that a flush was needed (i.e., the commands in the stream must be executed by the hardware), it would transition into kernel mode and pass the command stream to the graphics driver. The driver would then parse the command stream and translate it into hardware-specific commands, and typically write those commands into a memory buffer for consumption by the hardware.

Referring back to FIG. 4 in conjunction with FIGS. 6 and 7, Kernel Mode driver 405 would be of minimal size, implementing just enough code to initialize the hardware, initiate a DMA operation to consume an already-composed command buffer, and set up and handle interrupts. Implementing the invention in the context of FIG. 4 could take two forms. First, as mentioned above, Application 135 and Runtime 302 could be compiled by JIT 602 so that late-bound managed code was interacting with Driver DLL 303. JIT 602 would then know the exact characteristics of Driver DLL 303 at compile time (for example, whether it implemented transform and lighting acceleration), and it could take advantage of that knowledge when generating object code for the client computer.

The second, "managed driver" variant of the invention implemented in the context of FIG. 4 would entail having Application 135, Runtime 302, and Driver DLL 303 all compiled by JIT 602, so that a unified piece of executable code was performing the translation from API and writing hardware-specific commands into DMA memory 410. This architecture combines the robustness and other advantages of a layered driver model with the efficiency gained by the hardware specificity of an online driver model. Hence, this "managed driver model" proffers a higher potential for performance compared to other driver architectures.

As mentioned above, while exemplary embodiments of the present invention have been described in connection with various computing devices and network architectures, the underlying concepts may be applied to any computing device or system in which it is desirable to manage applications and drivers. Thus, the techniques for managing applications in accordance with the present invention may be applied to a variety of applications and devices. For instance, the advantages of the invention may be applied to the graphics system of a computing device, provided as a separate object on the device, as part of another object, as a downloadable object from a server, as a "middle man" between a device or object and the network, etc. The managed application generated may be stored for later use, or output to another independent, dependent or related process or service. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the boundary discovery techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having driver techniques as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network.

Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computerized method for software interaction with hardware, comprising:
    receiving an application program in an intermediate programming language:
    receiving at least a portion of a driver program in an intermediate language separate from the application program instructions, said driver program interacting with a computing component on a target computer system;
    receiving a runtime program in an intermediate programming language, wherein said runtime program performs the translation between said application instructions and said driver program;
    compiling the application program, the runtime program and the driver program into a single executable program for execution on the target computer system, wherein the single executable program is optimized by eliminating conditional code and wherein a at least one runtime function is inlined.

2. The method as recited in claim 1 wherein the driver program comprises a kernel mode portion in an executable form.

3. The method as recited in claim 2 wherein the driver program comprises a user mode portion provided in the intermediate language form.

4. The method as recited in claim 3 wherein the user mode portion translates from device driver interface instructions to hardware-specific commands.

5. The method as recited in claim 1 wherein the driver program writes hardware-specific commands into an operating system-allocated buffer for submission to a scheduler of the hardware's time.

6. The method as recited in claim 1 wherein the driver program is delivered over a network.

7. The method as recited in claim 1 wherein the application program and the runtime program are delivered to the target computer system over a network.

8. The method as recited in claim 1 wherein the step of compiling uses a Just-In-Time compiler.

9. A computer system, comprising:
    a processor;
        the processor operatively coupled to a computer readable storage medium including computer executable instructions, the computer readable storage medium includes:
        an operating system having a driver comprising a plurality of instructions that interacts with a computing component, at least a portion of said driver instructions being in an intermediate language;
        a plurality of application instructions separate from the driver instructions, said application instructions being in an intermediate language readable by an intermediate language compiler;
        a plurality of runtime instructions, said runtime instructions being in an intermediate language readable by an intermediate language compiler, wherein said runtime instructions performs the translation between said application instructions and said driver; and
        an intermediate language compiler capable of compiling the application instructions, the runtime instructions and said at least a portion of said driver instructions into a combined set of native instructions executable by the processor for interacting with the computing component, wherein the application instruction are optimized by eliminating conditional code and wherein a at least one runtime function is inlined.

10. The computer system as recited in claim 9 wherein the driver is split into user mode and kernel mode instructions.

11. The computer system as recited in claim 10 wherein the user mode instructions of the driver translates from device driver interface instructions to hardware-specific commands.

12. The computer system as recited in claim 11 wherein the driver writes hardware-specific commands into an operating system-allocated buffer for submission to a scheduler of the hardware's time.

13. The computer system as recited in claim 9 wherein the driver is delivered over a network.

14. The computer system as recited in claim 9 wherein the plurality of application instructions and the plurality of runtime instructions are delivered to the computer system over a network.

15. The computer system as recited in claim 9 wherein the intermediate language compiler comprises a Just-In-Time compiler.

16. A computer-readable medium having stored thereon computer-executable instructions for software interaction with hardware, comprising:

instructions for receiving an application program in an intermediate programming language;

instruction for receiving at least a portion of a driver program in an intermediate language separate from the application program instructions, said driver program interacting with a computing component on a target computer system; and instructions for receiving a runtime program in an intermediate programming language, wherein said runtime program performs the translation between said application instructions and said driver program;

instructions for compiling the application program, the runtime program and the driver program into a single executable program for execution on the target computer system, wherein the single executable program is optimized by eliminating conditional code and wherein a at least one runtime function is inlined.

17. The computer-readable medium as recited in claim 16 wherein the driver program comprises a kernel mode portion provided in an executable form wherein the the at least a portion of the driver program in an intermediate language received comprise user mode instructions.

18. The computer-readable medium as recited in claim 17 wherein the user mode instructions translate from device driver interface instructions to hardware-specific commands.

19. The computer-readable medium as recited in claim 18 wherein the driver program writes hardware-specific commands into an operating system-allocated buffer for submission to a scheduler of the hardware's time.

20. The computer-readable medium as recited in claim 16 comprising instructions for receiving the driver program over a network.

21. The computer-readable medium as recited in claim 16 comprising instructions for receiving the application program and the runtime program over a network.

22. The computer-readable medium as recited in claim 16 wherein the step of compiling uses a Just-In-Time compiler.

* * * * *